United States Patent [19]

McMahon

[11] 4,156,555

[45] May 29, 1979

[54] APPARATUS AND METHOD FOR PROVIDING UNBLURRED IMAGES WITH A CONTINUOUSLY SCANNED LIGHT BEAM

[75] Inventor: Donald H. McMahon, Carlisle, Mass.

[73] Assignee: Sperry Rand Corporation, New York, N.Y.

[21] Appl. No.: 792,299

[22] Filed: Apr. 29, 1977

[51] Int. Cl.² .............. G03H 1/26; B41B 17/14; B41B 17/20; G02B 27/17

[52] U.S. Cl. .................. 350/3.75; 350/6.91; 350/167; 354/5; 354/12

[58] Field of Search .............. 350/3.5, DIG. 2, 6, 350/7, 285, 167, 3.75, 3.78, 3.77, 6.1, 6.5, 6.91; 354/5,12,13; 346/108; 352/84

[56] References Cited

U.S. PATENT DOCUMENTS

| | | | |
|---|---|---|---|
| 2,400,887 | 5/1946 | Miller | 352/84 |
| 3,143,051 | 8/1964 | Teeple | 352/84 |
| 3,422,219 | 1/1969 | Teeple | 346/107 R |
| 3,504,609 | 4/1970 | Donald | 350/3.5 UX |
| 3,703,137 | 11/1972 | Anderson et al. | 350/3.78 |
| 3,831,035 | 8/1974 | Hill | 350/3.5 |
| 3,838,403 | 9/1974 | Maloney et al. | 350/3.5 |

Primary Examiner—Ronald J. Stern
Attorney, Agent, or Firm—Howard P. Terry; Seymour Levine

[57] ABSTRACT

An apparatus and method is disclosed for utilizing a low power light source in conjunction with a continuously scanned light beam deflector to form unblurred images of a vocabulary of characters at a plurality of discrete positions. The light source illuminates a scanning deflector from which an angularly scanned beam is directed towards a lens, from which it emerges as a linearly scanned beam. This linearly scanned beam illuminates a linear fly's eye lens array from which a plurality of substantially stationary beams are emitted, each of which may provide an unblurred image at a preselected position corresponding thereto.

8 Claims, 5 Drawing Figures

APPARATUS AND METHOD FOR PROVIDING UNBLURRED IMAGES WITH A CONTINUOUSLY SCANNED LIGHT BEAM

BACKGROUND OF THE INVENTION

1. Field of the Invention

This invention pertains to a method and apparatus for printing characters with a high write duty cycle in an electrophotographic printer using a low power CW light source.

2. Description of the Prior Art

Electro-optic printers may employ rating multifaceted prism scanners, galvanometer light beam deflectors or acousto-optic light beam deflectors to access the characters to be printed. The speed with which these light beam deflectors can access a character determines the printing rate of the over-all system. Acousto-optic deflectors which can randomly position a laser beam to access 2 to 5 characters in 5 microseconds or less, are commercially available but are relatively expensive. Galvanometer deflectors are available that cover a wide range of random access position and speeds; however, as the accessing speed increases, the number of Raleigh resolvable beam positions decrease and tradeoffs between accessing speed and character quality are required. Typical of these are the Honeywell models M25K and M1650 which can access approximately 20 and 1.0 characters, respectively, in one millisecond. Although rotating scanners do not provide a random access capability, a 16 faceted prism with a 45° deflection angle rotating at 3600 rpm can access approximately 100 characters and provide access to each in approximately one millisecond.

A typical line of computer printout contains positions for 132 characters. Consequently, by using a high speed galvanometer deflector such as the Honeywell M25K, approximately 10,000 lines per minute may be printed. However, allowing 50% of the available time for writing information onto a photoconductive drum, and the remaining 50% for positioning the deflector, the printing speed is limited to approximately 5,000 lines per minute. The same deflector, when utilized in a scanning mode by applying a sawtooth voltage at 1/10th the resonance frequency, can access each line of 132 characters in 0.5 m sec. This results in a sequential accessing rate in excess of 200,000 characters per second and approximately 90,000 lines per minute.

The quoted rates for sequential and random accessing of character positions assume that the scanning motion must stop during random accessing and that the scanning motion is continuous during sequential accessing. Since characters can be printed on a line in a sequential fashion the higher print rate can be made practical only if the writing can take place in the presence of a continuous deflector motion. This has been accomplished in the prior art by employing a reduced laser write duty cycle to print an instantaneous series of snapshots for each sequential character. Such an approach provides unblurred characters at high print speeds but at a sacrifice in laser usage efficiency and concomittantly, an increase in cost.

The principles to be herein described enabled high printing rates to be achieved with an inexpensive light beam deflector and a CW light source.

SUMMARY OF THE INVENTION

This invention provides a method and apparatus for converting a continuously scanned CW light beam into a set of discrete stationary light beam positions at a writing surface to establish a high printing rate without blurring the printed characters. In accordance with the invention, a deflector continuously scans a light beam across the aperture of a lens placed in the far field of the deflector so that the beam wavefront, at the aperture of the lens, appears to diverge from the deflector position. If the lens is positioned a distance from the deflector that is equal to the focal length of the lens, the lens produces a collimated beam, for each deflector position, the direction of which is independent of the angle of incidence from the deflector. The resulting parallel collimated light beams are sequentially incident to fly's eye lens (FEL) elements, of a linear fly's eye lens (FEL) array, wherefrom the collimated light beam is focussed, by each lens in the array, to a corresponding stationary well-defined region in the focal plane of the array. As the scanner rotates the light beam intensity is gradually transferred from the focal point of one FEL to a focal point of the adjacent FEL. In this manner, the FEL array converts the original continuously scanned light beam into a discrete number of sequentially accessed focal regions, which can readily be utilized to represent a succession of distinct beam angles. To prevent the simultaneous illumination of adjacent lens elements, opaque regions are placed therebetween. With this configuration, the light beam may remain on continuously if the character to be projected on the focal plane is switched during the instance when the light beam illuminates an opaque region. When the diameter of the collimated light beam and the dimensions of the opaque region are substantially equal to the diameter of each FEL, the effective light beam write duty cycle is 50%. A more thorough explanation of the foregoing operation is given in the detailed description provided hereinafter with reference to the accompanying drawings.

DESCRIPTION OF THE PREFERRED EMBODIMENTS

Figure 1:
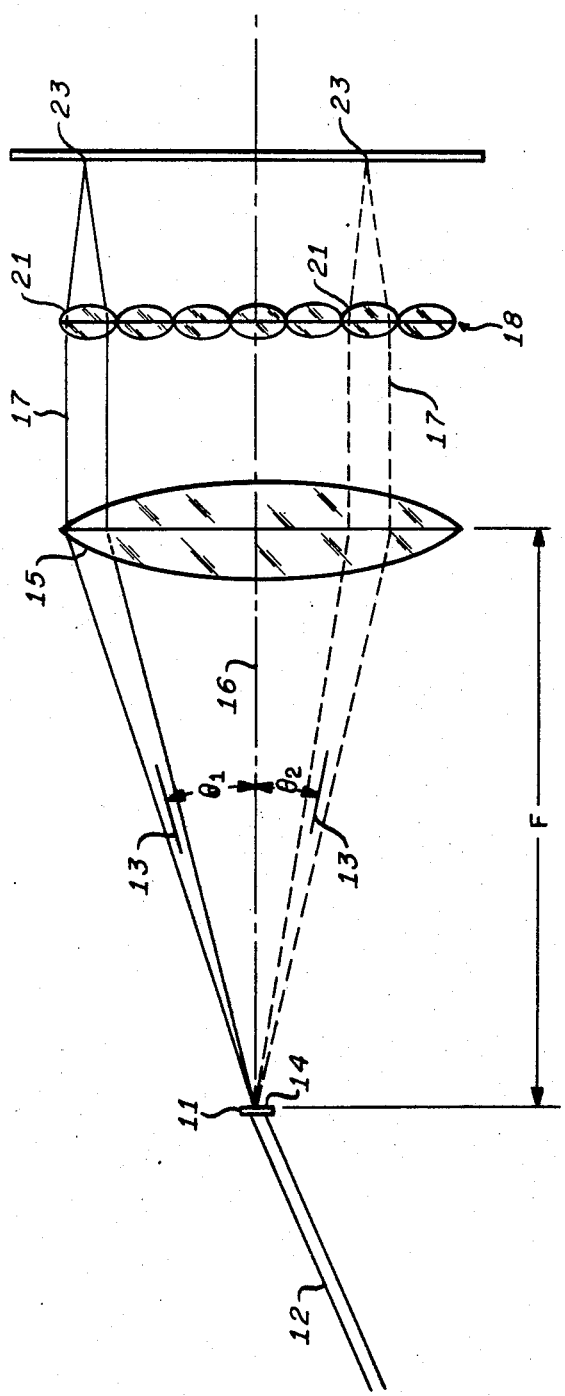
FIG. 1 is an optical schematic diagram useful in explaining the operation of the invention.

Referring to FIG. 1, there is shown a light beam deflector 11 which is illuminated by a light beam 12, and as a result thereof provides a deflected beam 13 that is scanned through a multiplicity of deflection angles in a continuous manner. Two of these angles, $\theta_1$ and $\theta_2$ are shown in the Figure. In the far field of the deflector 11, the deflected light beam 13 appears as a divergent light beam that is emitted from a point source located at the center 14 of the deflector 11. A lens 15, the axis of which extends through the center 14 of the deflector 11, is positioned at a distance F therefrom that is equal to the focal length of the lens 15. When the lens 15 is illuminated by the deflected light beam 13, it will refract the divergent rays therein into rays which are parallel to the lens axis 16, thus forming a collimated light beam 17, the propagation direction of which is independent of the angle of deflection of the deflected light beam 13 and the position at which it strikes the lens 15. The continuous scanning of the deflected light beam 13 causes the collimated light beam 17 to be continuously scanned across the aperture of a fly's eye lens (FEL) array 18, thus sequentially illuminating each FEL 21 which comprise the FEL array 18. Since the propagation direction of the collimated light beam 17 that illuminates each FEL 21 is independent of the deflection angle, the light passing through each FEL element 21 focusses to a stationary well-defined focal region 23 which corresponds thereto. Light intensity at a focal region 23 varies as the collimated beam 17 is scanned across the corresponding FEL 21, reaching a maximum when the entire collimated light beam 17 illuminates the aperture of the corresonding FEL 21. Thereafter, the intensity decreases as the adjacent FEL 21 commences to be illuminated and the light intensity is gradually transferred to the adjacent focal region. It should therefore be clear from the foregoing that the FEL array 18 converts the original continuous scanning motion of the deflector 11 into a plurality of discrete focal regions, each corresponding to a given range of deflection angles.

Figure 2:
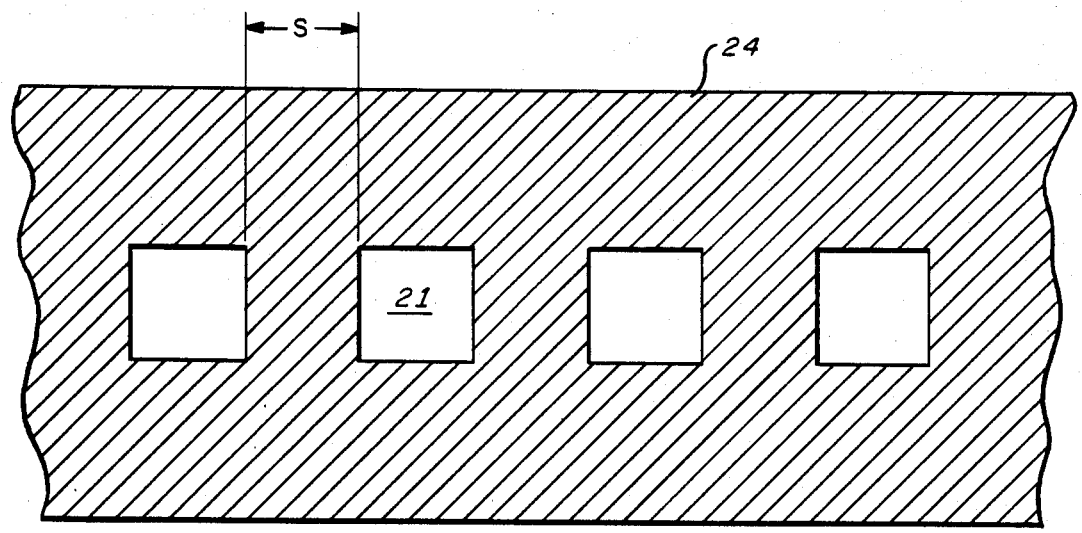
FIG. 2 illustrates the interposition of the opaque regions between the lens elements of a lens array.

If the collimated light beam is of dimensions substantially equal to dimensions of each FEL element 21 and the FEL elements 21 are contiguous, the time duration for which a single focal region is illuminated is vanishingly small and two adjacent focal regions will be simultaneously illuminated such that the light intensity at the focal region of the first decreases while the light intensity at the focal region of the second increases as the collimated beam scans across the FEL array 18. This simultaneous illumination of the focal regions 23 may be eliminated by modifying the FEL array 18 as shown in FIG. 2. This modification establishes a separation s of the FELs 21 and interposes an opaque material 24 therebetween. When the collimated beam 17, the FEL element 21, and the separation s are substantially equal, the remaining focal regions will be discretely illuminated and the simultaneous illumination of adjacent focal regions will be essentially eliminated. This arrangement allows the light beam 12 to continuously illuminate the deflector 11, provides a time interval during which the spatial modulation of the light beam 12 may be altered and establishes a 50% write duty cycle.

Figure 3:
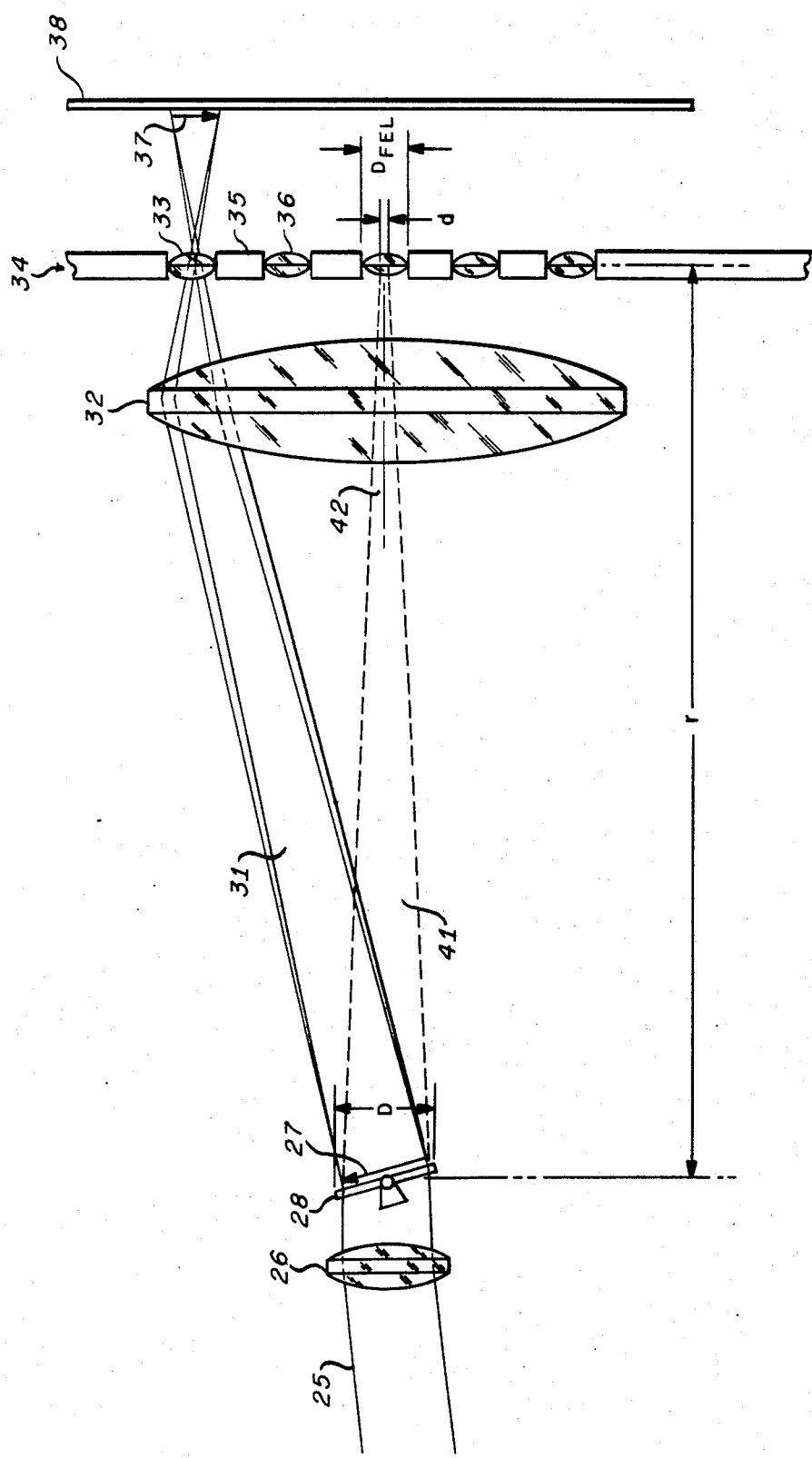
FIG. 3 is an optical schematic diagram of a preferred embodiment of the invention.

Refer now to FIG. 3. A spatially modulated light beam 25 passes through a converging lens 26 to focus an image 27 of a character to be printed onto a scanning deflector 28. A spatially modulated light beam 31 is deflected from the deflector 28 to illuminate a collimating lens 32. Modulated light beam 31 is refracted by the collimating lens 32 to illuminate a fly's eye lens 33 of a fly's eye lens array 34, which comprises alternate regions of FEL 33 and opaque materials 35. When the beam 31 is in an opaque region 35, the character mask upstream of light beam 25 may be changed to alter the spatial modulation of the light beam 25 and provide a different image 27 of a character on the deflector 28. Deflector 28 deflects the spatially modulated light beam 31, with this new spatial modulation, to subsequently illuminate FEL 36 after refraction from collimating lens 32. FEL 36, in turn, provides an image 37 of the new character in a plane 38 in which a light sensitive surface of an electrophotographic copier may be located. Lens 26 is placed immediately adjacent to the deflector 28 to control the amount of convergence of a deflected beam 41 (which is shown with the deflector 28 positioned to deflect a light beam incident thereto along the axis 42 of the lens 32). Lens 26 regulates the convergence such that an unmodulated beam, fully illuminating the scanning deflector 28, is deflected therefrom as light beam 41 which focusses to a sharp defraction limited spot in a plane coincident with the FEL array 34. It should be apparent to those skilled in the art that lens 32 may be removed and a sharp focus of an unmodulated light beam may still be maintained at the stationary focal regions of each of the FEL elements of the FEL array 34 if each of the FEL elements were aberration corrected for all directions of light incidence. The inclusion of lens 32 not only eliminates the necessity for this aberration correction, but also shortens the distance r between the deflector 28 and the FEL array 34 that is required to maintain the desired defraction limited spot size. If D is the diameter of the deflector 28, $\lambda$ is the wavelength of the light beam, and f is the distance between the deflector 28 and the FEL array 34, with the lens 32 removed, the diameter of the defraction limited spot in the absence of lens 32, is given by simple defraction theory as $2\lambda f/D$. However, if the deflector 28 comprises a multiplicity of resolution elements, each of size d, as would be the case if a character image were incident upon the deflector 28, the diameter of each FEL element $D_{FEL}$ must be $2n\lambda f/D$ where n is the number of linear resolution elements per character and is equal to D/d. In this manner, the diameter of the scanning deflector 28 and the diameter of each of the FEL elements in the FEL array are determined from the required Raleigh resolved beam positions for the desired image quality on the photoconductive drum surface 35.

Each FEL element 33 when illuminated with a spatially modulated beam focusses an image onto the photoconductive drum surface 38, the size of which is determined by the dimensions of the spatially modulated beam, the demagnification factor occasioned by the focal length of the FEL elements, and the distance between FEL array 34 and the photoconductive drum surface 38. Given a fixed character size on the drum, a given character quality in terms of resolution elements, and a given specific peak to peak light beam deflection angle, one skilled in the art may readily determine the necessary diameter of the scanning deflector 28, the diameter and focal length of each FEL element 33 and the remaining geometry of the optical system.

Since the character image on the photoconductive drum surface must remain stationary as the scanning deflector 28 rotates, the FEL elements must image originally stationary representations of the character. This can only occur if the image to be deflected is substantially superimposed on the stationary position of the rotating deflector mirror.

Figure 4:
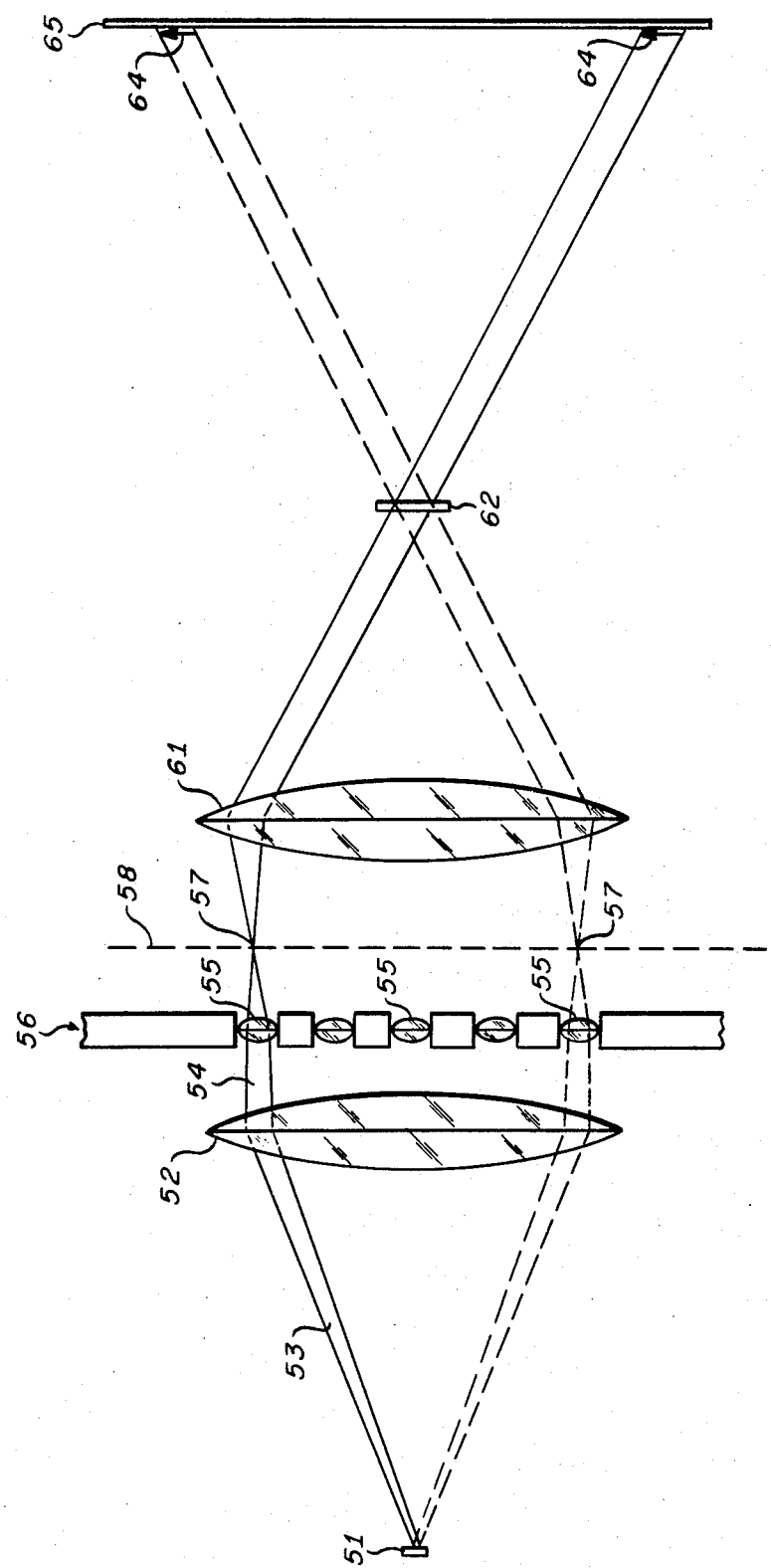
FIG. 4 is an optical schematic diagram of a preferred embodiment of the invention illustrating the use of a second collimating lens to illuminate a character mask or hologram.

In the embodiment of the invention shown in FIG. 4, a continuous scanning deflector 51, positioned in the focal region of a lens 52, deflects a light beam 53 which scans across the aperture of the lens 52, exiting therefrom as a collimated beam 54. Collimated beam 54 sequentially illuminates the FELs 55 of the FEL array 56 which focus the collimated beam 54 to discrete stationary regions 57 in the focal plane 58 of the FEL array 56. A second lens 61 is positioned from the focal plane 58 at a distance that is equal to its focal length, such that the light rays emanating from the focal regions 57, in the focal plane 58, produce a set of collimated light beams each with an angular direction corresponding to one of focal regions 57. These collimated light beams sequentially illuminate a hologram 62 that is appropriately positioned along the axis of the lens 61. Each collimated beam of the set emanating from lens 61 illuminates the hologram 62 to provide an image at a position 64 on photoconductive drum surface 65 that corresponds to the collimated beam within the set that instantaneously illuminates the hologram 62. FIG. 4 shows how a continuous scanning motion can be converted to a series of collimated light beams which propagate in fixed directions to illuminate a hologram character generating mask from which unblurred character images are produced at a series of fixed positions on a photoconductive drum surface. Various holographic optical systems presently exist that may be employed to generate the necessary vocabulary characters. One such system is described in U.S. Pat. No. 3,838,403 issued Sept. 24, 1974 to William T. Maloney and Donald H. McMahon and assigned to the Sperry Rand Corporation.

Figure 5:
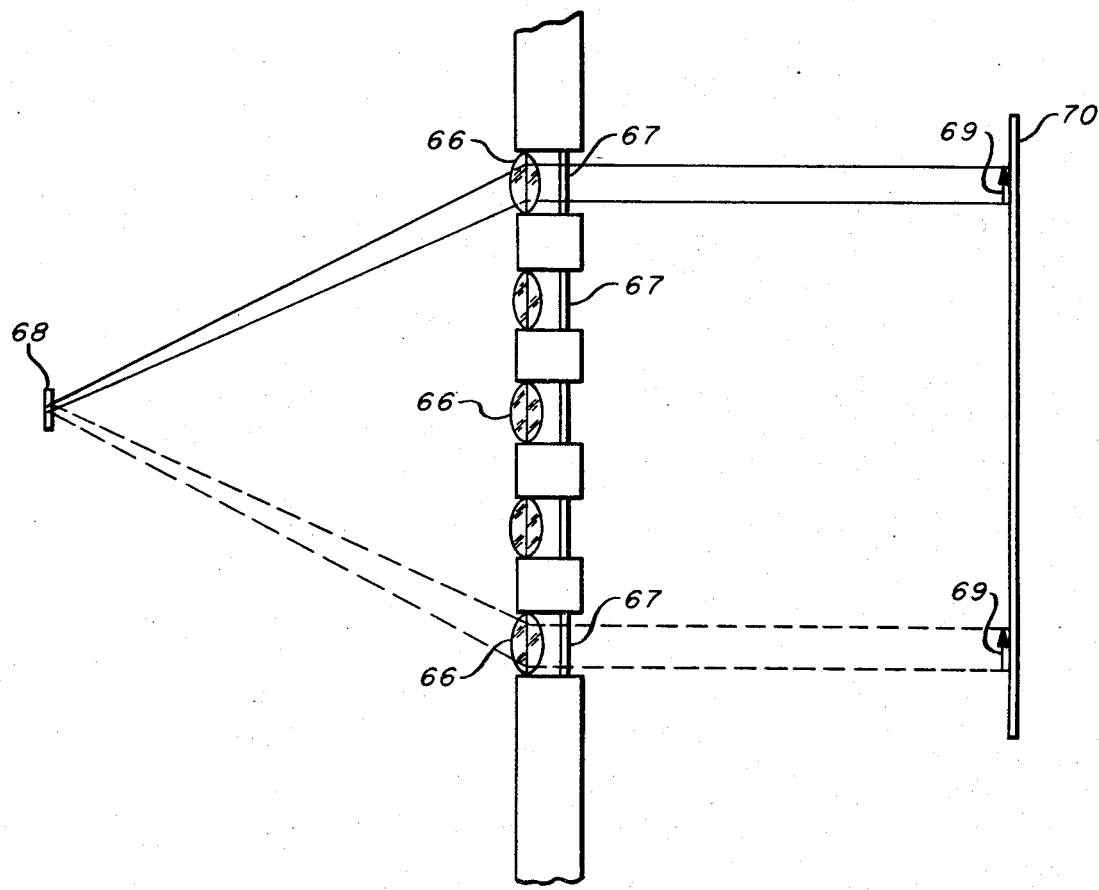
FIG. 5 illustrates an embodiment of the invention with which one of a multiplicity of holograms may be accessed.

In the embodiment of FIG. 5 each FEL 66 has associated therewith a holographic mask 67 which may be of the type described in the Maloney et al patent previously referenced. In this arrangement the scanning deflector 68 is positioned at the focal region of each FEL 66 so that the light deflected therefrom is collimated by the illuminated FEL. This collimated beam illuminates the hologram that is associated with the illuminated FEL, is spatially modulated thereby, and focussed to form an image at a fixed stationary location 69 on a photoconductive drum 70, that corresponds to the FEL-hologram combination illuminated. It will be apparent to those skilled in the art that the beam deflected from the deflector 68 may be collimated by removing the FEL elements 66 and positioning a single lens, such as lens 15 of FIG. 1, at a distance from the deflector 68 that is equal to its focal length.

While the invention has been described in its preferred embodiments, it is to be understood that the words which have been used are words of description rather than of limitation and that changes may be made without departing from the true scope and spirit of the invention in its broader aspects.

I claim:

1. An apparatus for providing unblurred images with a continuously scanned light beam comprising:
    a plurality of lens elements each of which is positioned to substantially collimate a scanned incident divergent, spatially unmodulated light beam; and
    a plurality of character generators positioned adjacent said plurality of lens elements in a one-to-one correspondence, each lens element character generator pair having an associated image area, in one-to-one correspondence therewith, in a defined image plane, said lens element character generator pairs arranged and adapted such that said substantially collimated light beam from one of said lens elements illuminates said corresponding character geneator to cause a substantially unblurred image to be formed at said image area associated with said illuminated lens element character generator pair.

2. An apparatus for providing unblurred images with a continuously scanned light beam in accordance with claim 1 wherein said plurality of lens element-character generator pairs includes opaque regions dispersed between adjacent lens element-character generator pairs such that alternate periods of lens element-character generator illuminations and opaque region illuminations are provided as said incident divergent light beam scans across said plurality of lens element-character generator pairs.

3. An apparatus for providing unblurred images with a continuously scanned light beam in accordance with claim 2 wherein said lens element-character generator pairs and said opaque regions are of dimensions that provide substantially equal periods of lens illumination and opaque region illumination.

4. An apparatus for providing unblurred images with a continuously scanned light beam comprising:
    means responsive to an angularly scanned divergent light beam for converting said angularly scanned divergent light beam into a linearly scanned first substantially collimated light beam;
    means for converting said linearly scanned first substantially collimated light beam into a set of discrete substantially stationary light beams which focus at, and diverge from, focal regions in a focal plane, each focal region in said focal plane being in one-to-one correspondence with said discrete substantially stationary light beams;
    means for transforming said light beams diverging from each of said focal regions to second substantially collimated light beams, all of said second substantially collimated light beams being directed to illuminate one common illumination area, a second substantially collimated light beam being incident to said common area at an angle determined by the position of said focal region in said focal plane corresponding to said diverging light beam from which said incident second substantially collimated light beam was derived; and
    means positioned at said common illumination area for spatially modulating said second substantially collimated light beam with spatial modulation representative of characters to be imaged at imaging regions in an imaging plane, each imaging region corresponding to one of said collimated light beams with its position in said imaging plane being determined by said angle of incidence to said common illumination area of said corresponding second substantially collimated light beam.

5. An apparatus for providing unblurred images with a continuously scanned light beam in accordance with claim 4 wherein said converting means comprises a plurality of lens elements each of which, when illuminated by said linearly scanned collimated light beam, establishes a substantially stationary light beam which focusses at said focal region in said focal plane corresponding to said illuminated lens element.

6. An apparatus for providing unblurred images with a continuously scanned light beam in accordance with claim 5 wherein said plurality of lens elements includes opaque regions dispersed between adjacent lens elements such that alternate periods of lens illumination and opaque region illumination are provided as said collimated light beam linearly scans across said plurality of lens elements.

7. An apparatus for providing unblurred images with a continuously scanned light beam in accordance with claim 6 wherein said lens elements and said opaque regions are of dimensions that provide substantially equal periods of lens illumination and opaque region illumination.

8. A method for providing unblurred images with a continuously scanned light beam comprising the steps of:

deflecting a light beam in a continuous manner to establish an angularly scanned light beam;

collimating said deflected light beam thereby converting said angularly scanned light beam into a linearly scanned light beam;

converting said linearly scanned light beam into a plurality of discrete, substantially stationary light beams each of which focusses at, and diverges from, a corresponding focal region in a focal plane by alternately illuminating a focussing means and an opaque means such that adjacent focal regions are not simultaneously illuminated;

transforming said diverging light beams diverging from each of said focal regions to collimated light beams, all of said collimated light beams being incident to a common illumination area at an angle determined by the position of said focal region in said focal plane corresponding to said diverging light beam from which the incident substantially collimated light beam was derived; and modulating said substantially collimated light beams at said common area with spatial modulation representative of images to be formed at image regions in an image plane, each image region corresponding to one of said substantially collimated light beams with its position determined by said angle of incidence to said common illumination area of said corresponding substantially collimated light beam.

* * * * *